United States Patent [19]

Hoen

[11] 4,137,610

[45] Feb. 6, 1979

[54] INDUSTRIAL TWO-MEMBER RELEASABLE LOCKING FASTENER

[75] Inventor: Cuyler Hoen, Rennesselaer, N.Y.

[73] Assignee: Simmons Fastener Corporation, Albany, N.Y.

[21] Appl. No.: 861,187

[22] Filed: Dec. 16, 1977

[51] Int. Cl.² ............................................. A44B 21/00
[52] U.S. Cl. ................................................. 24/221 K
[58] Field of Search ............ 24/221 R, 221 A, 221 K, 24/109, 73 RM

[56] References Cited

U.S. PATENT DOCUMENTS

| | | | |
|---|---|---|---|
| 1,798,526 | 3/1931 | Fitzgerald | 24/221 K |
| 2,095,271 | 10/1937 | Swanstrom | 24/221 K |
| 2,334,676 | 11/1943 | Jones | 24/221 A |
| 2,514,922 | 7/1950 | Zahodiakin | 24/221 A |

*Primary Examiner*—Kenneth J. Dorner
*Attorney, Agent, or Firm*—Eliot S. Gerber

[57] ABSTRACT

A releasable locking fastener for industrial applications comprises a turn member actuator which may be attached to one panel and a receptacle member which may be attached to another panel. The turn member actuator includes a turn member, a retention means and a flat spring for resiliently disposing the turn member. The turn member is stamped as a unitary member from sheet metal and comprises a turning head means, an upper shank portion having a retention means seat, a middle shank portion having indentations, and a lower shank portion preferably having one or two cammed shoulders and terminating in a rounded nose. The receptacle member includes a base having an elongated opening, an indentation in the base transverse to the opening, and a plurality of stops protruding from the base.

9 Claims, 13 Drawing Figures

U.S. Patent   Feb. 6, 1979   Sheet 1 of 2   4,137,610
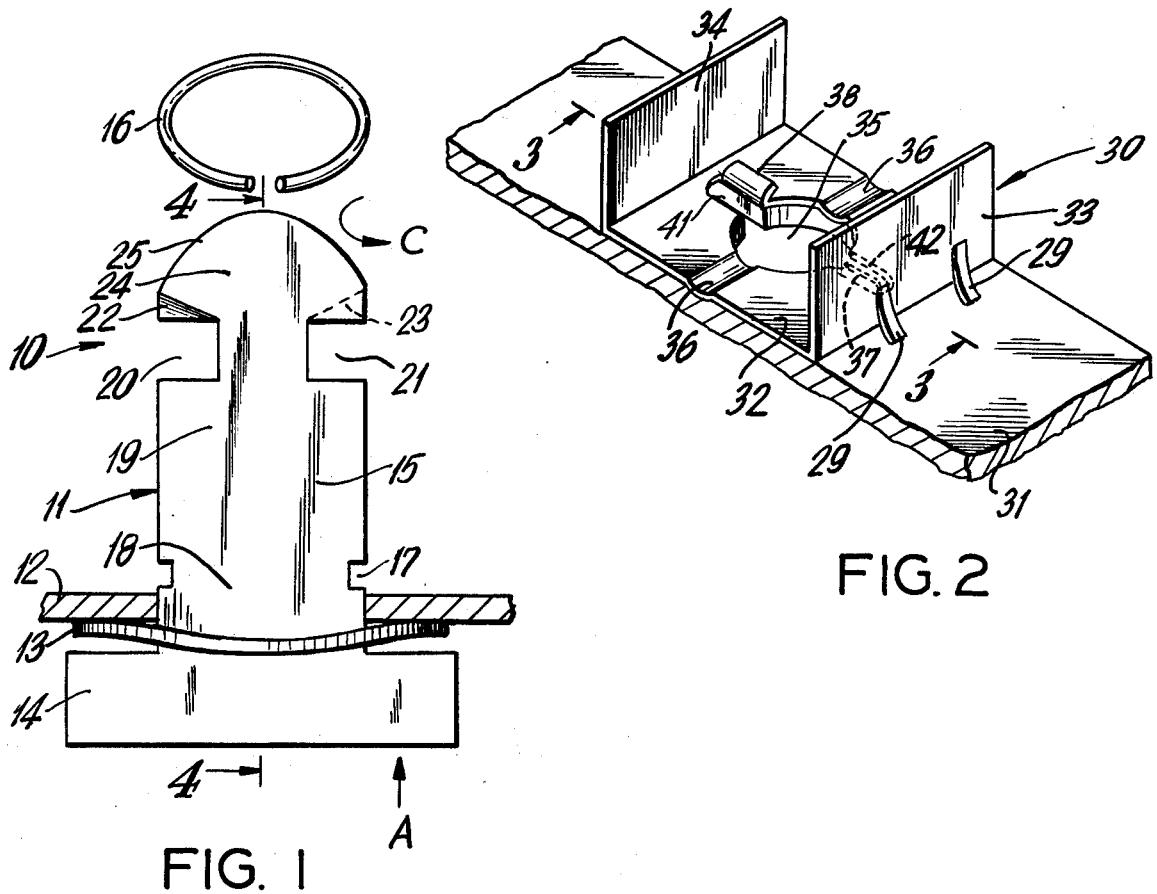
FIG. 1
FIG. 2
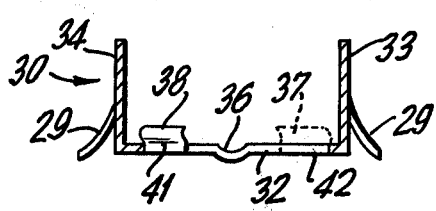
FIG. 3
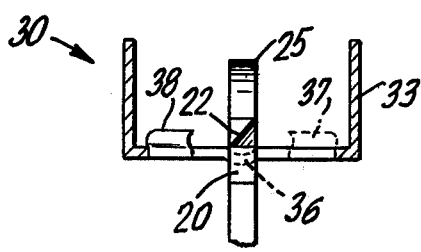
FIG. 5
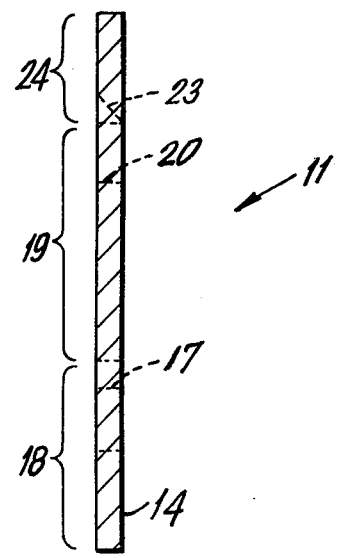
FIG. 4

INDUSTRIAL TWO-MEMBER RELEASABLE LOCKING FASTENER

BACKGROUND OF THE INVENTION

The present invention relates to industrial fastners and more particularly to those industrial fasteners which are used to removably secure two panels.

At the present time there are a number of industrial fasteners commercially available to secure two panels, and many types of such fasteners have been proposed in prior patents. The panels may be, for example, flush mounted machine service or enclosure panels which are to be readily opened and closed. The fastener of the present invention is particularly well suited for assembling curved sheets such as engine cowlings, flat sheets such as access panels, and accommodating slightly misaligned holes in the two panels to be joined.

Generally, industrial fasteners of this general type consist of two separated members each one of which is attached to one of the panels. For example, one panel may be the machine wall or frame and the other may be the service or enclosure panel. Such fasteners may be used to obtain tight seals while allowing for quick access. Frequently, such fasteners are locked by a 90° turn and unlocked by a 90° turn in the opposite direction.

Such two-member fasteners may be generally classified to be of one of two types. The first is a spring socket type wherein the receptacle grips and exerts a tension on the stud member, as is disclosed in U.S. Pat. No. 2,200,702 to Oddie; U.S. Pat. No. 2,250,072 to Tinnerman; U.S. Pat. No. 2,413,510 to Luce; U.S. Pat. No. 2,334,676 to Jones; and U.S. Pat. No. 2,589,028 to Poupitch. Similarly, U.S. Pat. No. 3,900,931 to Lavoillotte discloses a ramped receptacle tensioning member.

An alternative general type of fastener, illustrated by U.S. Pat. No. 2,486,411 to Huelster; U.S. Pat. No. 3,136,017 to Preziosi; U.S. Pat. No. 2,975,667 to Bross; U.S. Pat. No. 3,675,280 to Winslade and U.S. Pat. No. 2,884,667 to Zahodiakin, discloses spring-loaded stud members. However, these above-mentioned spring-loaded stud fastener patents all also include spring retaining housings and all but the Preziosi patent require the lateral stud projections to transverse a ramped receptacle for fastener tightening. Although the Preziosi patent relies on the spring stud for tensioning the receptacle member, that stud comprises two plate members.

It has also been suggested that the turn member of an industrial fastener may be stamped from sheet stock, as in U.S. Pat. Nos. 3,900,931 and 2,593,064, or may be formed as a flat member as in U.S. Pat. No. 2,334,676.

The presently commercially available fasteners have been found satisfactory for many purposes. However, there is a need for a rugged, easily operable, not overly complex or expensive fastener which may be made from relatively low cost materials without relatively expensive machining or other relatively costly manufacturing operations.

SUMMARY OF THE INVENTION

The present invention provides an industrial fastener which comprises two members. The first member is a turn member which is an actuator and may be secured to one panel. The second member is a receptacle member which may be secured to a second panel. The turn member is rotated by the user to fasten and unfasten the two panels.

The turn member actuator comprises a number of parts which may be stamped from sheet metal stock, which is a low-cost operation compared to the machining of parts. The turn member actuator includes a stamped flat sheet metal turn member, a stamped and formed flat spring for resiliently disposing the turn member with respect to the panel, and a retention means which preferably also is a stamped sheet metal member. The turn member is a unitary member and includes a turning head means portion and a shank portion. The upper shank portion includes a seat for the turn member retention means. The retention means is a suitable device which will rigidly locate in the retaining seat, such as a stamped metal or formed spring steel "C" clip, and thereby connect the turn member to the panel while permitting rotating of the turn member. The turn member is resiliently disposed with respect to the first panel by a resilient flat spring such as a bellville spring, which is positioned between the turning head means and the panel. Accordingly, a vertically applied force will cause the turn member to compress the resilient means and move closer to the panel. The turn member will resume its original position upon relaxation of the applied force.

The flat turn member has a middle shank portion which includes two oppositely disposed indentations which cooperate with the receptacle member upon turn member depression. Preferably, the walls of the indentation are cammed or rounded to facilitate receptacle cooperation. The shank portion terminates in a rounded nose, allowing easier alignment between the turn member and the receptacle.

The turning head means (head portion) of the turn member is such that it accepts rotational force. A multiplicity of designs are possible, including a slotted screw head to be turned by a screwdriver or coin, a wing head to be turned by hand, and a hex head to be turned by a socket wrench or other tool.

The receptacle member is preferably stamped from sheet metal stock and includes a base. The base, for certain applications, may have upwardly directed side walls. An elongated opening is disposed in the base to accept the removable turn member. A downwardly directed indentation transverse to the elongated opening provides a lock position seat for the turn member. A plurality of stops project from the base in the direction away from the opening and are positioned at diagonally opposite sides of the elongated opening. These stops permit turn member movement only in one direction to lock and in the opposite direction to unlock the turn member.

To withdraw the turn member from the receptacle the user rotates the turn member backwards, enabling the turn member to attain realignment with the elongated opening, whereupon the turn member may be withdrawn from the receptacle member to disengage the fastener.

FEATURES OF THE INVENTION

It is a feature of the present invention to provide a fastener comprising a stud-like turn member to be resiliently and rotatively attached to one panel and a receptacle to be fastened to the other. The turn member comprises a turning head means, a flat sheet metal shank portion, a retaining means and a resilient flat spring means. The turning head means may be an extremity which may be gripped by hand or tool (plier or screwdriver) such that the turn member may be rotated.

The turn member further comprises a shank portion including a rounded nose, oppositely directed indentations in the middle shank portion, and a retention means seat in its upper shank portion. The middle shank portion indentations have squared upper and inside walls, while the lower indentation wall is preferably cammed or rounded. The turn member further comprises a flat resilient spring means for exerting pressure between the turning head means and the attached panel.

The receptacle member comprises, in general, a base having an elongated opening having indentations on opposite sides of the elongated opening and directed at right angles to that opening. The base is attached to the second panel. In one embodiment the receptacle member comprises a base having upwardly directed side walls. In that embodiment the receptacle member base includes a laterally elongated opening and a plurality of stops articulated from, and adjacent to, the elongated opening portions. In all cases the receptacle member base includes an indentation transverse to the elongated opening and extending on opposite sides thereof for positive seating of the turn member. The receptacle member side walls may include winged flanges for panel attachment.

BRIEF DESCRIPTION OF THE DRAWINGS

Other features and objectives of the present invention will be apparent from the following detailed description of the invention which should be taken in conjunction with the accompanying drawings, which presents the inventor's best mode of carrying out the present invention.

In the drawings:

FIG. 1 is a front exploded view of the turn member actuator inserted through a hole in its panel, the panel being shown in cross-section;

FIG. 2 is a perspective view of the receptacle;

FIG. 3 is a cross-sectional view of the receptacle taken along line 3—3 of FIG. 2 and looking in the direction of the arrows;

FIG. 4 is a side cross-sectional view of the turn member taken along line 4—4 of FIG. 1 and looking in the direction of the arrows;

FIG. 5 is a cross-sectional view of a portion of the turn member inserted in the receptacle;

DETAILED DESCRIPTION OF THE INVENTION

Figure 6:
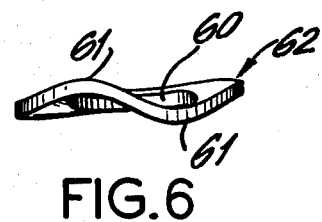
FIG. 6 is a side plan view of one form of a flat type spring for use in the present invention.

As shown in FIGS. 1 and 2, the fastener of the present invention, generally designated as 10, comprises a turn member 11 and a receptacle 30, both of which may be stamped and formed as sheet metal parts. Consequently, those parts may be formed from relatively expensive metal, such as stainless steel, and yet be relatively low in cost. The turn member 11 is stamped from sheet metal and includes a turning head means (head portion 14) and a shank portion 15. The turn member 11 is rotatably attached to first panel 12. The turn member 11 is inserted through a hole in the first panel 12 with a bellville spring 13 or other flat spring, preferably stamped and formed from flat spring steel sheet metal, for resiliently positioning the turn member 11 relative to the first panel 12 by exerting spring pressure between the first panel 12 and the turn means 14. In one modification the flat type spring may ride on a flat washer (not shown) if the panel is of soft material, such as a plastic resin or aluminum. In another modification a flat washer (not shown) may be positioned between the flat type spring 13 and turn means 14 to hid the flat type spring and improve the appearance of the fastener.

Figure 7:
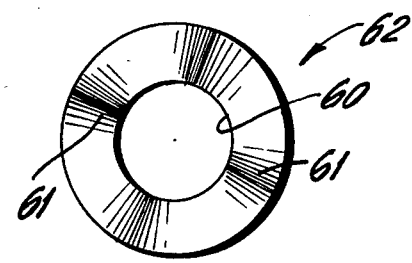
FIG. 7 is a top plan view of the spring of FIG. 6.
Figure 8:
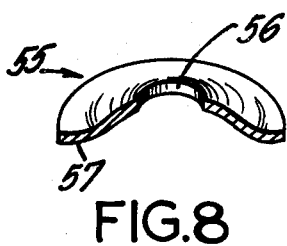
FIG. 8 is a side view, partly in perspective and partly in cross-section, of an alternative flat type spring for use in the present invention.

The term "flat type spring," as used in this specification and appended claims, means that the spring is not a helical or coil spring formed from wire or other round metal stock but rather is formed, for example, by stamping and forming operations, from flat sheet metal. In no case is the "flat type spring" in its final form in a flat shape, i.e., it is not a section of a plane. The "flat type spring" in each case has protrusions or formed portions which extend along its axis to provide a resilient effect. For example, as shown in FIGS. 6 and 7, the flat type spring may be a wave spring having a central opening 60 and raised portions 61 which are integral portions of the ring 62. An alternative flat type spring is bellville washer spring 55, shown in FIG. 8, in which the spring steel sheet is stamped to form a washer having hole 56. Then the stamped washer is dished by pressure (to form a dish shape) and heat tempered. The bellville washer 55 has a curved bottom flange 57 to prevent excessive rubbing of the panel.

Figure 9:
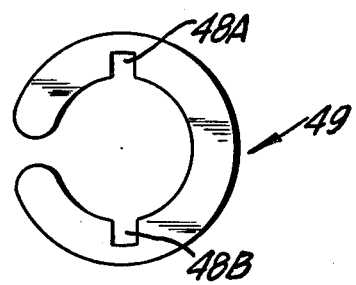

As shown in FIG. 1, the turn member 11 is secured to the first panel 12 by insertion of a resilient "C" retaining ring 16 or other retention means in the retention means seat 17, located in the upper shank portion 18 of the turn member 11. The ring 16 may be a locking ring which is round or half-round, i.e., "D" shaped, or rectangular in cross-section. A flat resilient "C" ring 49 having opposed slots 48A, 48B is shown in FIG. 9.

Figure 10:
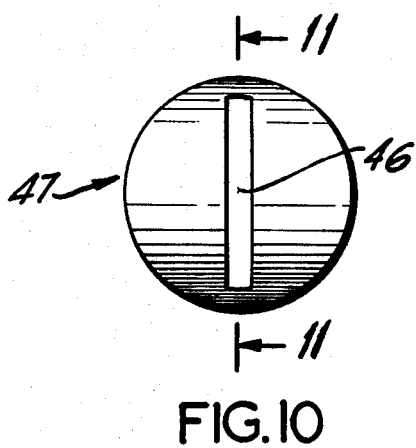
FIGS. 9, 10 and 12 are top views of alternative retainer means.
Figure 11:
FIG. 11 is a cross-sectional view taken along line 11—11 of FIG. 10; and rotated clockwise 180°

An alternative retention means is shown in FIGS. 10 and 11, which show metal resilient disk 47 having elongated slot 46. The disk 47 is normally curved (dish-shaped) but is temporarily bent to be flat, as in FIG. 10, when it is fitted onto the seat 17. After being so fitted, it returns to its curved shape.

Figure 12:
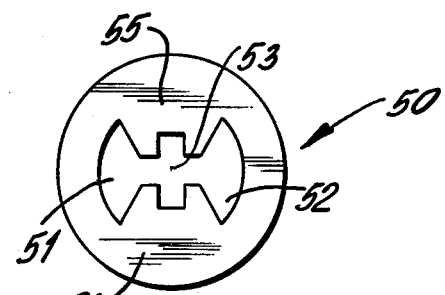

A still further alternative retention means is shown in FIG. 12, in which a flat spring steel member 50 has opposed openings 51,52 and a central opening 53 to form opposed spring arms 54,55. An alternative retention means (not shown) is a closed circular ring-washer which is forced into an oval shape for positioning on the retention means seat 17 and is then allowed to resume its normal circular shape.

Generally the retention means seat 17 is spaced a distance from the turn member head 14, which distance is slightly greater than the thickness of the first panel 12. Consequently, the turn member 11 is resiliently secured to the first panel 12 such that exertion of a force in the direction of arrow A on the turn member head 14 will cause the turn member to move against spring pressure relative to the first panel 12.

The turn member head 14, although shown as a rectangular panel, may be of any configuration which will enable the turn member to be rotated. A slotted screw head of the flush head and oval head types, a hexagonal nut head, as well as a wing head, are within the contemplation of the present invention for use as the turn member head.

The middle turn member shank portion 19 is restricted such that two oppositely disposed indentations 20 and 21 are formed. Referring now to FIG. 4, the lower indentation walls 22,23 of turn member 11 are cammed in the lock direction of turn member rotation, that direction being designated by arrow C in FIG. 1.

The lower shank portion 24 terminates in a rounded nose 25 which facilitates positioning of the turn member 11 with respect to the receptacle 30.

Figure 13:
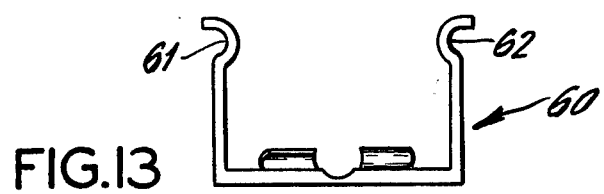
FIG 13 is a side plan view of an alternative receptacle.

The receptacle 30 complements turn member 11 and is attached to the second panel 31 by means well known in the art, such as screws or rivets, or by cleats 29 which project from the receptacle side walls and are held against panel 31 due to their resiliency. Alternatively, and not shown, the cleats may be used to hold the receptacle in a pocket, for example, a pocket formed in a plastic injection molded member. An alternative receptacle 60 is shown in FIG. 13 and has opposed outwardly facing elongated indentations 61,62 (channels) at the top of the side walls to grab the edges of a panel opening. The receptacle member, shown in cross-section in FIG. 3, includes a base 32 and two upwardly projecting walls 33 and 34. The base 32 has an elongated opening 35, two oppositely disposed tab-like stops 37 and 38, and an indentation 36 transverse to the direction of the opening elongation and extending on both sides of the opening 35.

The elongated opening 35 has a minimum length such that the full width of the turn member shank portion 19 can be inserted therethrough. Further, the opening (not shown) in the case of a front surface mounted receptacle should be of a sufficient diameter and depth to accommodate the "C" retaining clip 16 if it is desired that the two panels be flush against each other.

The stops 37 and 38 may be any base projection, but are preferably formed by cutting the base opening elongations 41,42 in the form of tabs which are subsequently bent upwardly.

Upon surface engagement of the first and second panels 12 and 31, the turn member 11 is aligned by means of the rounded nose 25 with the elongated opening 35, such that movement of the turn member in the direction of arrow A will cause insertion of the turn member 11 through the elongated opening 35. Whereupon the turn member indentations 20,21 will cooperate with the elongated opening 35, allowing rotation of the turn member 11 such that the lower indentation walls 22,23 will align with the transverse indentation 36. Removal of the depression force causes the lower indentation walls 22,23 to seat in the indentation 36, due to the force of the flat spring 13, thereby causing the turn member to be locked in its "home" position, i.e., with indentation walls 22,23 in the indentation 36.

The cammed lower cavity walls 22,23 complement the curvature of the base indentation 36 such that, if the turn member was likely to move, it would move in the direction of the cam, as indicated by arrow C, since the friction would be less in that direction. Should the turn member 11 receive a slight force tending to move it out of its seat in the direction of arrow C, the fastener 10 will remain locked because the turn member nose 25 will encounter upwardly projecting stops 37,38 and be inhibited from further rotation.

To release the fastener from lock position, the turn member 11 is depressed and rotated in a direction opposite to the direction of the turn member cam until the turn member nose 24 aligns with the elongated opening 35. Thereupon the turn member 11 may be withdrawn from the receptacle member 30 for disengagement of the fastener 10.

What is claimed is:

1. A fastener comprising a turn member adapted to be fastened to a first panel, a securing means on one side of said first panel for positioning said turn member relative to said first panel, a flat spring resilient means for resiliently separating said turn member and said first panel on the opposite side of said first panel; said turn member comprising as a unitary stamped sheet metal single thickness member a head portion and a shank portion, said shank portion having a securing means seat, a restricted middle portion in the form of two oppositely disposed indentations, and a nose portion;

said fastener further comprising a receptacle member adapted to be fastened to a second panel, said receptacle having a base, said base having an elongated opening, an indentation transverse to said opening and extending on opposite sides of said opening away from said opening, and a projecting stop;

wherein upon alignment of said nose with said opening and upon insertion of said turn member into said base member, said restricted shank portion will cooperate with said opening whereupon angular rotation of said turn member relative to said receptacle member will locate and seat said turn member in said indentation upon removal of said turn member insertion force.

2. A fastener as in claim 1 wherein the flat spring means for resiliently positioning said turn member with respect to the first panel is a bellville spring.

3. A fastener as in claim 1 wherein the securing means is a "C" spring.

4. A fastener as in claim 1 wherein said turn member head portion is substantially flat and rectangular.

5. A fastener as in claim 1 wherein said securing means seat is a groove.

6. A fastener as in claim 1 wherein the securing means is a disk having an elongated opening.

7. A fastener as in claim 1 wherein the securing means is a flat ring-like member having inwardly directed resilient arms.

8. A fastener as in claim 1 and further including a second projecting stop on the opposite side of said receptacle opening from the first projecting stop.

9. A fastener as in claim 1 wherein said receptacle has opposite side walls directed away from said second panel.

* * * * *